United States Patent
Funayama et al.

(10) Patent No.: US 8,283,039 B2
(45) Date of Patent: Oct. 9, 2012

(54) VULCANIZED RUBBER LAMINATE

(75) Inventors: Toshiyuki Funayama, Osaka (JP); Shigeru Shoji, Osaka (JP); Yasushi Hamura, Osaka (JP); Toyofumi Otaka, Osaka (JP)

(73) Assignee: Daiso Co., Ltd., Osaka-shi (JP)

( * ) Notice: Subject to any disclaimer, the term of this patent is extended or adjusted under 35 U.S.C. 154(b) by 467 days.

(21) Appl. No.: 11/277,434

(22) Filed: Mar. 24, 2006

(65) Prior Publication Data

US 2006/0216518 A1    Sep. 28, 2006

(30) Foreign Application Priority Data

Mar. 25, 2005   (JP) ................................. 2005-089961
Mar. 31, 2005   (JP) ................................. 2005-101604

(51) Int. Cl.
*B32B 27/38* (2006.01)
*B32B 27/00* (2006.01)
*F16L 11/00* (2006.01)
*F16L 9/14* (2006.01)

(52) U.S. Cl. ......... 428/413; 428/421; 138/137; 138/141
(58) Field of Classification Search ................ 428/36.91, 428/413, 421; 138/137, 141
See application file for complete search history.

(56) References Cited

U.S. PATENT DOCUMENTS

| | | | | |
|---|---|---|---|---|
| 4,146,033 A | * | 3/1979 | Ide et al. | ......................... 604/28 |
| 4,606,952 A | | 8/1986 | Sugimoto et al. | |
| 5,519,079 A | * | 5/1996 | Tomoshige et al. | ............ 524/436 |
| 5,891,941 A | * | 4/1999 | Tanaka et al. | .................. 524/232 |
| 6,106,914 A | | 8/2000 | Kanbe et al. | |
| 2005/0191454 A1 | * | 9/2005 | Kaneko et al. | ............. 428/36.91 |

FOREIGN PATENT DOCUMENTS

| | | |
|---|---|---|
| EM | 0 687 708 A1 | 12/1995 |
| EP | 0 303 244 A2 | 2/1989 |
| EP | 0 545 368 A1 | 6/1993 |
| EP | 0 657 499 A1 | 6/1995 |
| EP | 0 962 311 A1 | 12/1999 |
| JP | 58-103555 | 6/1983 |
| JP | 64-11180 | 1/1989 |
| JP | 2-160867 | 6/1990 |
| JP | 4-372652 | 12/1992 |
| JP | 9-85898 | 3/1997 |

OTHER PUBLICATIONS

"High Functional Fluoroelastomer", pp. 5,6 (with translation of the Tables of p. 5), 1994.
A.L. Moran, Viton fluoroelastomer, pp. 1 and 2 (with translation of the Table of p. 1 and the Table of p. 2, left column), 2003.

* cited by examiner

*Primary Examiner* — Mark Eashoo
*Assistant Examiner* — Angela C Scott
(74) *Attorney, Agent, or Firm* — Oblon, Spivak, McClelland, Maier & Neustadt, L.L.P.

(57) ABSTRACT

The invention provides a vulcanized rubber laminate obtained by firmly bonding an unvulcanized epichlorohydrin rubber layer and an organic peroxide-containing fluororubber layer. The laminate is obtained by thermal adhesion a layer of an unvulcanized epichlorohydrin rubber composition to a layer of an unvulcanized fluororubber composition. The epichlorohydrin rubber composition comprises 1) an unvulcanized epichlorohydrin rubber containing 3 to 15 mol % of allyl glycidyl ether unit, 2) quinoxaline-based vulcanizing agents, mercaptotriazine-based vulcanizing agents or bisphenol-based vulcanizing agents, and 3) 1,8-diazabicyclo(5,4,0)undecene-7 salts, 1,5-diazabicyclo(4,3,0)nonene-5 salts, quaternary ammonium salts, quaternary phosphonium salts, basic white carbons or an alkaline metal salt of higher fatty acid the fluororubber composition comprises an fluororubber and an organic peroxide-based vulcanizing agent.

15 Claims, No Drawings

VULCANIZED RUBBER LAMINATE

BACKGROUND OF THE INVENTION

1. Field of the Invention

The present invention relates to a vulcanized rubber laminate obtained by firmly bonding an epichlorohydrin rubber layer to a fluororubber layer containing an organic peroxide-based vulcanizing agent.

2. Description of the Related Art

Increase of engine room temperature, recycle of exhaust gas, and fuel evaporative emission regulation have recently progressed in view of exhaust gas control and energy saving, and as a result, it has been required that rubber materials to be used therefor have thermal aging resistance, resistance to weather, sour gasoline and alcohol-containing gasoline, and low fuel permeation, etc. Rubber materials having the above properties, which can be used in fuel oil hoses, include fluororubbers. However, the fluororubbers are expensive and disadvantageously poor in cold resistance. Thus, laminates having an inner layer of a fluororubber and an outer layer of an epichlorohydrin rubber have widely been used in the hoses for fuel oils such as gasoline instead of acrylonitrile-butadiene copolymer rubbers (NBR). In the laminates of the fluororubber layers and epichlorohydrin rubber layers, vulcanizing agents for the fluororubbers have been selected from bisphenol-, polyamine-, or peroxide-based vulcanizing agents, etc. depending on the purpose of use, and now the use of the peroxide-based vulcanizing agents is expanding because the fluororubbers using them are excellent in aging resistance to the fuel oils.

In the above multilayer rubber hoses, adhesiveness between the different rubber layers is the most important subject. It is known that the fluororubber layer and epichlorohydrin rubber layer are poor in the adhesiveness to each other, and thus the rubbers are generally bonded by methods of adding additives to the epichlorohydrin rubbers, etc.

Polyol- or polyamine-based vulcanizing agents are added to the fluororubbers in Examples of JP-A-58-103555, JP-A-1-11180, JP-A-2-160867, and JP-A-9-85898, but addition of organic peroxides has not been disclosed.

A laminate using an organic peroxide- or amine-based vulcanizing agent in a fluororubber is described in JP-A-4-372652. In this laminate, the adhesiveness is poor when a vulcanizing agent other than the peroxide- or amine-based agent is used in an epichlorohydrin rubber, and a particular phosphonium salt has to be added to the epichlorohydrin rubber. Further, the epichlorohydrin rubber using the organic peroxide- or amine-based vulcanizing agent has insufficient heat resistance.

SUMMARY OF THE INVENTION

The inventors have found that, in a laminate of an epichlorohydrin rubber and a fluororubber using a peroxide-based vulcanizing agent, the amount of allyl glycidyl ether in the epichlorohydrin rubber is particularly important. The present invention has been accomplished based on the finding. According to the invention, a vulcanized rubber laminate is provided by firmly bonding an unvulcanized epichlorohydrin rubber layer and an organic peroxide-containing fluororubber layer to each other.

Thus, the first aspect of the present invention relates to a vulcanized rubber laminate obtained by thermal adhesion a layer of (A) an unvulcanized epichlorohydrin rubber composition to a layer of (B) an unvulcanized fluororubber composition, wherein (A) the unvulcanized epichlorohydrin rubber composition comprises (1) 100 parts by weight of an unvulcanized epichlorohydrin rubber containing an allyl glycidyl ether unit, or an unvulcanized epichlorohydrin rubber blend including at least an unvulcanized epichlorohydrln rubber containing an allyl glycidyl ether unit, the mole ratio of the unit to the total of the rubbers being 3 to 15 mol %, (2) 0.1 to 10 parts by weight of a vulcanizing agent selected from the group consisting of quinoxaline-based vulcanizing agents, mercaptotriazine-based vulcanizing agents, bisphenol-based vulcanizing agents or a mixture thereof, and (3) 0.1 to 10 parts by weight of a compound selected from the group consisting of 1,8-diazabicyclo(5,4,0)undecene-7 salts, 1,5-diazabicyclo(4,3,0)nonene-5 salts, quaternary ammonium salts, quaternary phosphonium salts, basic white carbons, and alkaline metal salts of higher fatty acids or a mixture thereof, with the proviso that the content of the basic white carbons is 0.1 to 30 parts by weight, and (B) the unvulcanized fluororubber composition comprises 100 parts by weight of an unvulcanized fluororubber and 0.1 to 10 parts by weight of an organic peroxide-based vulcanizing agent.

The second aspect of the present invention relates to a vulcanized rubber laminate obtained by thermal adhesion a layer of (A) an unvulcanized epichlorohydrin rubber composition to a layer of (B) an unvulcanized fluororubber composition, wherein (A) the unvulcanized epichlorohydrin rubber composition comprises (1) 100 parts by weight of an unvulcanized epichlorohydrin rubber containing an allyl glycidyl ether unit, or a blend including at least the unvulcanized epichlorohydrin rubber containing an allyl glycidyl ether unit, the mole ratio of the unit to the total of the rubbers being 3 to 15 mol %, (2) 0.1 to 10 parts by weight of a thiourea-based vulcanizing agent, and (3) 0.1 to 10 parts by weight of a compound selected from the group consisting of 1,8-diazabicyclo(5,4,0)undecene-7 salts, 1,5-diazabicyclo(4,3,0)nonene-5 salts, quaternary ammonium salts, quaternary phosphonium salts, basic white carbons, and alkaline metal salts of higher fatty acids or a mixture thereof, with the proviso that the content of the basic white carbons is 0.1 to 30 parts by weight, and (B) the unvulcanized fluororubber composition comprises 100 parts by weight of an unvulcanized fluororubber and 0.1 to 10 parts by weight of an organic peroxide-based vulcanizing agent.

DETAILED DESCRIPTION OF THE INVENTION

In the present invention, (A) the unvulcanized epichlorohydrin rubber composition comprise mainly an unvulcanized epichlorohydrin rubber having an allyl glycidyl ether unit, and the mole ratio of the unit to the rubber is 3 to 15 mol %, preferably 5 to 15 mol %. The unvulcanized epichlorohydrin rubber may be a blend of a plurality of unvulcanized epichlorohydrin rubbers. In this case, at least one of the unvulcanized epichlorohydrin rubbers has an allyl glycidyl ether unit, and the mole ratio of the unit to the blend of the unvulcanized rubbers is 3 to 15 mol %, preferably 5 to 15 mol %. The mole ratio of the allyl glycidyl ether unit is preferably 3 to 15 mol %, more preferably 5 to 15 mol %. When the mole ratio is less than 3 mol %, the resultant composition is not excellent in adhesiveness. When the mole ratio is more than 15 mol %, it is not preferable because the heat resistance of vulcanization turns worse.

Each epichlorohydrin rubber may be an epichlorohydrin/ethylene oxide/allyl glycidyl ether terpolymer, an epichlorohydrin/allyl glycidyl ether copolymer, an epichlorohydrin/ethylene oxide copolymer, or an epichlorohydrin homopolymer. Specific examples of the epichlorohydrin rubbers include terpolymers containing 20 to 70 mol % of an epichlorohydrin unit, 20 to 79 mol % of an ethylene oxide unit, and 3 to 15 mol % of an allyl glycidyl ether unit, and copolymers containing 20 to 70 mol % of an epichlorohydrin unit and 30 to 80 mol % of ethylene oxide unit. The molecular weight of the unvulcanized epichlorohydrin rubber is preferably such that its Mooney viscosity $ML_{1+4}$ (100° C.) is 30 to 150. In a case where the blend is used, also the blend preferably has a Mooney viscosity $ML_{1+4}$ (100° C.) of 30 to 150.

A vulcanizing agent used in the unvulcanized epichlorohydrin rubber composition may be selected from the group consisting of mercaptotriazine-based vulcanizing agents, quinoxaline-based vulcanizing agents, and bisphenol-based vulcanizing agents.

Examples of the vulcanizing agents include quinoxaline-based vulcanizing agents such as 2,3-dimercaptoquinoxaline, quinoxaline-2,3-dithiocarbonate, 6-methylquinoxaline-2,3-dithiocarbonate, and 5,8-dimethylquinoxaline-2,3-dithiocarbonate, mercaptotriazine-based vulcanizing agents such as 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine, and 1-phenylamino-3,5-dimercaptotriazine, and bisphenol-based vulcanizing agents such as bisphenol AF and bisphenol S.

Thiourea-based vulcanizing agents such as 2-mercaptoimidazoline, 1,3-diethylthiourea, 1,3-dibutylthiourea, and trimethylthiourea can be used, too.

Preferred examples of the vulcanizing agents include 2-mercaptoimidazoline (ethylene thiourea), 6-methylquinoxaline-2,3-dithiocarbonate, 2,4,6-trimercapto-1,3,5-triazine, and bisphenol AF. Two or more of these vulcanizing agents may be used in combination as long as they do not ruin the advantageous effects of the invention.

The amount of the vulcanizing agent is 0.1 to 10 parts by weight, preferably 0.3 to 5 parts by weight, based on 100 parts by weight of the unvulcanized epichlorohydrin rubber(s). When the amount is less than the range, the sufficient crosslinking cannot be achieved. On the other hand, when the amount is more than the range, the vulcanized product is excessively rigid and desired properties of the vulcanized epichlorohydrin rubber product cannot be obtained in some cases.

In the invention, the unvulcanized epichlorohydrin rubber composition further contains at least one compound selected from the group consisting of 1,8-diazabicyclo(5,4,0)undecene-7 salts (hereinafter referred to also as DBU salts), 1,5-diazabicyclo(4,3,0)nonene-5 salts (hereinafter referred to also as DBN salts), quaternary ammonium salts, quaternary phosphonium salts, basic white carbons, and alkaline metal salts of higher fatty acids. These compounds act to accelerate the vulcanization and more firmly bond the epichlorohydrin rubber composition layer to the fluororubber composition layer. That is, These compounds act as adhesion accelerators. In the cases of the 1,8-diazabicyclo(5,4,0)undecene-7 salts, 1,5-diazabicyclo(4,3,0)nonene-5 salts, quaternary ammonium salts, quaternary phosphonium salts, and alkaline metal salts of higher fatty acids, the amount of the compounds is 0.1 to 10 parts by weight, preferably 0.1 to 5 parts by weight, based on 100 parts by weight of the unvulcanized epichlorohydrin rubber(s). In the case of the basic white carbons, the amount thereof is 0.1 to 30 parts by weight, preferably 0.1 to 15 parts by weight, based on 100 parts by weight of the unvulcanized epichlorohydrin rubber(s). When the amount is less than the range, the strong adhesiveness cannot be obtained. When the amount is more than the range, the vulcanization rate is excessively increased to cause processing difficulties.

Examples of the 1,8-diazabicyclo(5,4,0)undecene-7 salts (DBU salts) include DBU carbonate salts, DBU stearate salts, DBU 2-ethylhexanate salts, DBU benzoate salts, DBU-salicylate salts, DBU 3-hydroxy-2-naphthoate salts, DBU phenol resin salts, DBU 2-mercaptobenzothiazole salts, and DBU 2-mercapto benzimidazole salts. Examples of the 1,5-diazabicyclo(4,3,0)nonene-5 salts (DBN salts) include DBN carbonate salts, DBN stearate salts, DBN 2-ethylhexanate salt, DBN benzoate salts, DBN salicylate salts, DBN 3-hydroxy-2-naphthoate salts, DBN phenol resin salts, DBN 2-mercaptobenzothiazole salts, and DBN 2-mercaptobenzimidazole salts. Examples of the quaternary ammonium salts include quaternary ammonium salts, tetrabutylammonium salts and tetraoctylammonium salts, and examples of the quaternary phosphonium salts include quaternary phosphonium salts, tetrabutylphosphonium salts and tetraoctylphosphonium salts.

The alkaline metal salt of higher fatty acid is so-called a metal soap. The higher fatty acid thereof has preferably 6 to 30 of carbon atoms, more preferably 12 to 24 of carbon atoms. Specific examples of the alkaline metal salts of higher fatty acids are sodium salts or potassium salts of partially hydrogenated tallow fatty acids, stearic acid, oleic acid, sebacic acid and castor oil. Preferred examples of the alkaline metal salts of higher fatty acids are sodium salts of partially hydrogenated tallow fatty acids, sodium stearate, potassium salts of partially hydrogenated tallow fatty acids and potassium stearate.

In the invention, known vulcanization accelerators and vulcanization retardants may be added to the unvulcanized epichlorohydrin rubber composition. Examples of the vulcanization accelerators include sulfur, thiuram sulfides, morpholine sulfides, amines, weak acid salts of amines, polyfunctional vinyl compounds, mercaptobenzothiazoles, guanidine such as 1,3-Diphenylguanidine, sulfenamides, and dimethiocarbamates. The vulcanization retardants include N-cyclohexyl-2-benzothiazolyl sulfenamide, N-cyclohexylthiophthalimides, organic zinc compounds, and acidic silica. The amount of the vulcanization accelerator or vulcanization retardant is 0 to 10 parts by weight, for example 0.1 to 5 parts by weight, based on 100 parts by weight of the unvulcanized epichlorohydrin rubber(s).

In the invention, a metal compound and/or an inorganic microporous crystal, which act as an acid acceptor, may be added to the unvulcanized epichlorohydrin rubber composition in view of vulcanization rate control and thermal stability of the vulcanized product. Examples of the metal compounds include oxides, hydroxides, carbonate salts, carboxylate salts, silicate salts, borate salts, and phosphate salts of metals of Group II of the Periodic Table, and oxides, basic carbonate salts, basic carboxylate salts, basic phosphite salts, basic sulfite salts, and tribasic sulfate salts of metals of Group IVA of the Periodic Table.

Specific examples of the metal compounds used as the acid acceptor include magnesia, magnesium hydroxide, barium hydroxide, magnesium carbonate, barium carbonate, sodium carbonate, lime, slaked lime, calcium carbonate, calcium silicate, calcium stearate, zinc stearate, calcium phthalate, calcium phosphite, zinc white, tin oxide, litharge, red lead, white lead, bibasic lead phthalate, bibasic lead carbonate, basic lead silicate, tin stearate, basic lead phosphite, basic tin phosphite, basic lead sulfite, and tribasic lead sulfate. Particularly preferred acid acceptors include magnesia, calcium carbonate, slaked lime, lime, and sodium carbonate.

The inorganic microporous crystal means a microporous crystalline material which can be distinguished clearly from porous amorphous materials such as silica gel, alumina, etc. The inorganic microporous crystal may be composed of a zeolite, aluminophosphate type molecular sieve, layered silicate salt, synthetic hydrotalcite, or alkaline metal titanate salt. The acid acceptor is particularly preferably a synthetic hydrotalcite.

Examples of the zeolites include natural zeolites, A-, X-, or Y-type synthetic zeolites, sodalites, natural or synthetic mordenites, ZSM-5, and metal-substituted derivatives thereof, and they may be used singly or in combination of two or more. The metal of the metal-substituted derivative is generally sodium. The zeolite preferably has a large acid acceptability, and is preferably an A-type zeolite.

The synthetic hydrotalcite is represented by the following general formula (3):

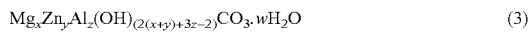

$$Mg_xZn_yAl_z(OH)_{(2(x+y)+3z-2)}CO_3 \cdot wH_2O \quad (3)$$

wherein x and y are real numbers satisfying the relation of x+y=1 to 10, z is a real number of 1 to 5, and w is a real number of 0 to 10. Examples of the hydrotalcites represented by the general formula (3) include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot wH_2O$, and $Mg_3ZnAl_2(OH)_{12}CO_3$.

The amount of the acid acceptor is preferably 0.2 to 50 parts by weight, more preferably 0.5 to 50 parts by weight, particularly 1 to 20 parts by weight, based on 100 parts by weight of the unvulcanized epichlorohydrin rubber(s). When the amount is less than the range, the sufficient crosslinking cannot be achieved. On the other hand, when the amount is more than the range, the vulcanized product is excessively rigid and desired properties of the vulcanized epichlorohydrin rubber product cannot be obtained in some cases.

The unvulcanized epichlorohydrin rubber composition used in the invention may contain an additive common in this field, such as an antiaging agent, a filler, a reinforcing agent, a plasticizer, a processing aid, pigment, a flame retardant a lubricant in addition to the above acid acceptors.

The fluororubber in (B) the unvulcanized fluororubber composition is preferably a highly fluorinated elastic copolymer such as a copolymer of vinylidene fluoride and another copolymerizable fluorine-containing olefin. Examples of the fluorine-containing olefins include hexafluoropropene, pentafluoropropene, trifluoroethylene, trifluorochloroethylene, tetrafluoroethylene, vinyl fluoride, perfluoro(methyl vinyl ether), and perfluoro(propyl vinyl ether), and one or a plurality of them may be used as a copolymerization component.

Preferred examples of the fluororubbers include vinylidene fluoride-hexafluoropropene copolymers, and vinylidene fluoride-tetrafluoroethylene-hexafluoropropene terpolymers.

The unvulcanized fluororubber composition used in the invention contains an organic peroxide-based vulcanizing agent. Examples of the organic peroxide-based vulcanizing agents include tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate.

The amount of the vulcanizing agent may be appropriately determined depending on the purpose of use, and is generally 0.1 to 10 parts by weight based on 100 parts by weight of the unvulcanized fluororubber composition.

The fluororubber composition may further contain a known ingredient such as a vulcanization accelerator, metal acid acceptor compound, stabilizer, reinforcing agent, filler, coloring agent, processing aid, or plasticizer, in addition to the organic peroxide vulcanizing agent. In the invention, the content of the ingredient is not restricted, and the fluororubber composition may contain any organic peroxide-based vulcanizing agent according to the purpose of use.

The laminate of the invention may be produced such that both the rubber compositions are laminated by co-extrusion and then heat-vulcanized or vulcanization-molded, or such that both the rubber compositions are laminated and thermally vulcanization-molded using a metal mold at the same time. Further, the laminate may be produced such that one of the rubber compositions is heat-vulcanized slightly while keeping a desired shape, and then the compositions are laminated and sufficiently vulcanization-molded thermally. The compositions laminated by the extrusion may be thermally vulcanization-molded by using a metal mold, and the heat vulcanization may be carried out by using a known autoclave, air bath, infrared ray, microwave, lead sheathing vulcanization, etc. In the vulcanization, the heating temperature is generally 100 to 200° C., and the heating time may be selected depending on the temperature and is generally 0.5 to 300 minutes.

Typical examples of fuel oil hoses using the laminate of the invention include 2-layer hoses having an inner layer of the fluororubber and an outer layer of the epichlorohydrin rubber, 3-layer hose having a braided reinforcing layer on the outer layers, and 4-layer hose further having a rubber layer thereon. A braided material for the 3- or 4-layer hose may comprise a polyester fiber, polyamide fiber, glass fiber, vinylon fiber, cotton, etc. The outermost rubber layer of the 4-layer hose generally contains a synthetic rubber having thermal aging resistance, resistance to weather, and oil, such as an epichlorohydrin rubber, ethylene-acrylate rubber, chloroprene rubber, chlorinated polyethylene rubber, or chlorosulfonated polyethylene.

Thus obtained vulcanized rubber laminate of the invention is remarkably excellent in the adhesiveness between the vulcanized rubber layers, and the adhesion surface is firm. Therefore, the laminate is remarkably useful for such applications that one surface needs to have resistance to sour gasoline, gasoline permeation, alcohol-containing gasoline, etc. and the other surface needs to have thermal aging resistance, resistance to weather, gasoline, etc., such as fuel hoses and filler hoses.

EXAMPLES

The present invention will be described below with reference to Examples without intention of restricting the scope of the invention.

Examples 1 to 13 and Comparative Examples 1 to 4

Each epichlorohydrin rubber composition shown in Tables 1 and 2 was kneaded with a kneader and an open roll to obtain a sheet (A) having a thickness of 2 to 2.5 mm. A fluororubber composition shown in Table 3 was kneaded in the same manner to prepare a sheet (B) having a thickness of 1 to 1.5 mm. The sheets (A) and (B) were attached to each other and pressed at 160° C. for 30 minutes at 20 to 25 kg/cm² to obtain a vulcanized rubber laminate having a thickness of 3.5 to 4.0 mm.

The obtained vulcanized rubber laminate was subjected to a T-peel test according to JIS K6256 such that the laminate was cut into a strip of 2.5×10 cm to prepare a adhesion test sample and T-peeled at 25° C. at a peeling rate of 50 mm/min. The results of the test are shown in Table 4.

Components *1 to *15 used in Examples and Comparative Examples are as follows.

*1 Epichlorohydrin-ethylene oxide-allyl glycidyl ether terpolymer (mole ratio 56:41:3) manufactured by Daiso Co., Ltd.
*2 Epichlorohydrin-ethylene oxide-allyl glycidyl ether terpolymer (mole ratio 48:48:4) manufactured by Daiso Co., Ltd.
*3 Epichlorohydrin-ethylene oxide-allyl glycidyl ether terpolymer (mole ratio 51:41:7) manufactured by Daiso Co., Ltd.
*4 Epichlorohydrin-ethylene oxide-allyl glycidyl ether terpolymer (mole ratio 32:58:10) manufactured by Daiso Co., Ltd.
*5 Epichlorohydrin-ethylene oxide-allyl glycidyl ether terpolymer (mole ratio 63:34.5:2.5) manufactured by Daiso Co., Ltd.
*6 Epichlorohydrin-ethylene oxide copolymer (mole ratio 49:51) manufactured by Daiso Co., Ltd.
*7 Epichlorohydrin homopolymer manufactured by Daiso Co., Ltd.
*8 P-152 manufactured by Daiso Co., Ltd.
*9 CARPREX #1120 manufactured by Shionogi Co., Ltd.
*10 DHT-4A manufactured by Kyowa Chemical Industry Co., Ltd.
*11 DYNAMAR RC 5215Q manufactured by 3M
*12 DYNAMER FC 5157 manufactured by 3M
*13 DYNAMAR FX 5166 manufactured by 3M
*14 DAIEL G901 (terpolymer fluororubber) manufactured by Daikin Industries, Ltd.
*15 sodium salts of partially hydrogenated tallow fatty acids manufactured by Kao Co., Ltd.

TABLE 1

Unvulcanized epichlorohydrin rubber composition

| | Parts by weight Composition | | | | | | | | | |
|---|---|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| Allyl glycidyl ether unit content (mol %) of epichlorohydrin rubber(s) | 3 | 4 | 4 | 6 | 7 | 10 | 0 | 2.5 | 0 | 7 |
| ECH-EO-AGE terpolymer rubber *1 | 100 | | | | | | | | | |
| ECH-EO-AGE terpolymer rubber *2 | | 100 | | | | | | | | |
| ECH-EO-AGE terpolymer rubber *3 | | | 60 | | 100 | | | | | 100 |
| ECH-EO-AGE terpolymer rubber *4 | | | | 50 | | 100 | | | | |
| ECH-EO-AGE terpolymer rubber *5 | | | | | | | | 100 | | |
| ECH-EO copolymer rubber *6 | | | 40 | | | | 100 | | 100 | |
| ECH homopolymer rubber *7 | | | | 50 | | | | | | |
| FEF carbon (reinforcing agent) | 50 | 50 | 50 | 50 | 50 | 50 | 50 | 50 | 50 | 50 |
| Di(butoxyethoxy)ethyl adipate (plasticizer) | 10 | 10 | 10 | 10 | 10 | 10 | 10 | 10 | 10 | 10 |
| Sorbitan monostearate (lubricant) | 3 | 3 | 3 | 3 | 3 | 3 | 3 | 3 | 3 | 3 |
| Magnesium oxide (acid acceptor) | 3 | 3 | 3 | 3 | 3 | 3 | 3 | 3 | 3 | 3 |
| DBU phenol resin salt (adhesion accelerator) *8 | 1 | 1 | 1 | 1 | 1 | 1 | 1 | 1 | | |
| Ethylene thiourea (vulcanizing agent) | 1.2 | 1.2 | 1.2 | 1.2 | 1.2 | 1.2 | 1.2 | 1.2 | 1.2 | 1.2 |
| N-cyclohexyl-2-benzothiazolyl sulfenamide (vulcanization retardant) | 1 | 1 | 1 | 1 | 1 | 1 | 1 | 1 | 1 | 1 |
| Sulfur (vulcanization accelerator) | 0.1 | 0.1 | 0.1 | 0.1 | 0.1 | 0.1 | 0.1 | 0.1 | 0.1 | 0.1 |

TABLE 2

Unvulcanized epichlorohydrin rubber composition

| | Parts by weight Composition | | | | | | |
|---|---|---|---|---|---|---|---|
| | Ex. 7 | Ex. 8 | Ex. 9 | Ex. 10 | Ex. 11 | Ex. 12 | Ex. 13 |
| Allyl glycidyl ether unit content (mol %) of epichlorohydrin rubber(s) | 7 | 7 | 7 | 7 | 7 | 7 | 7 |
| ECH-EO-AGE terpolymer rubber *3 | 100 | 100 | 100 | 100 | 100 | 100 | 100 |
| FEF carbon (reinforcing agent) | 50 | 50 | 50 | 40 | 50 | 50 | 50 |
| Basic white carbon (adhesion accelerator) *9 | | | | 10 | | | |
| Di(butoxyethoxy)ethyl adipate (plasticizer) | 10 | 10 | 10 | 10 | 10 | 10 | 10 |
| Sorbitan monostearate (lubricant) | 3 | 3 | 3 | 3 | 3 | 3 | 3 |
| Magnesium oxide (acid acceptor) | 3 | 3 | 3 | | 3 | | |
| Synthetic hydrotalcite (acid acceptor) *10 | | | 3 | 3 | 3 | | 3 |
| Calcium carbonate (acid acceptor) | | | | | 5 | | |
| Sodium carbonate (acid acceptor) *11 | | | | | | 12 | |
| DBU phenol resin salt (adhesion accelerator) *8 | 1 | 1 | | | 0.2 | | |
| Ethylene thiourea (vulcanizing agent) | 1.2 | | | | | | |
| N-cyclohexyl-2-benzothiazolyl sulfenamide (vulcanization retardant) | 1 | | | | | | |
| Sulfur (vulcanization accelerator) | 0.1 | | | | | | |

TABLE 2-continued

Unvulcanized epichlorohydrin rubber composition

| | Parts by weight Composition | | | | | | |
|---|---|---|---|---|---|---|---|
| | Ex. 7 | Ex. 8 | Ex. 9 | Ex. 10 | Ex. 11 | Ex. 12 | Ex. 13 |
| N-cyclohexyl thiophthalimide (vulcanization retardant) | 1 | 1 | | 0.5 | 1 | | 1 |
| 6-Methylquinoxaline-2,3-dithiocarbonate (vulcanizing agent) | 1.7 | 1.7 | 1.7 | | | | 1.7 |
| 1,3-Diphenylguanidine (vulcanization accelerator) | | | | | 0.5 | | |
| 2,4,6-trimercapto-1,3,5-triazine (vulcanizing agent) | | | | | 0.9 | | |
| Bisphenol AF (vulcanizing agent) *12 | | | | | | 2 | |
| Quaternary phosphonium salt (adhesion accelerator) *13 | | | | | | 1 | |
| Tetrabutylammonium bromide (adhesion accelerator) | | | 1 | | | | |
| alkaline metal salts of higher fatty acids (adhesion accelerator) *15 | | | | | | | 3 |

TABLE 3

Unvulcanized fluororubber composition

| Composition | Parts by weight |
|---|---|
| Fluororubber *14 | 100 |
| SRF carbon | 13 |
| Triallyl isocyanurate | 4 |
| 2,5-dimethyl-2,5-di(tert-butylperoxy)hexane | 1.5 |

TABLE 4

Adhesion test

| | Laminate | | | | | | | | | |
|---|---|---|---|---|---|---|---|---|---|---|
| | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 |
| Peeling strength (N/cm) | 13 | 15 | 54 | 69 | 78 | 82 | 5 | 5 | 0 | 6 |
| Peeling state | Good | Good | Excellent | Excellent | Excellent | Excellent | Bad | Bad | Poor | Bad |

| | Laminate | | | | | | |
|---|---|---|---|---|---|---|---|
| | Ex. 7 | Ex. 8 | Ex. 9 | Ex. 10 | Ex. 11 | Ex. 12 | Ex. 13 |
| Peeling strength (N/cm) | 78 | 21 | 22 | 67 | 36 | 32 | 51 |
| Peeling state | Excellent | Good | Good | Excellent | Excellent | Excellent | Excellent |

The peeling state was evaluated as follows.
Excellent: Layers were firmly bonded, and rubber breaking was caused therebetween.
Good: Peeling strength was relatively good, while rubber breaking was not caused.
Bad: Layers were bonded under small peeling strength, and peeling was caused at boundary.
Poor: Layers were not bonded at all, and peeling was caused at boundary.

As shown in Table 4, the vulcanized rubber laminates of Examples 3, 4, 5, 6, 7, 10, 11, 12 and 13 according to the present invention were remarkably excellent in the adhesiveness between the vulcanized rubber layers. In these Examples, the layers were bonded firmly and were not peeled off at the adhesion surface. In Examples 1, 2, 8, and 9, the laminates were excellent in the peeling strength though the layers were peeled off at the adhesion surface, and the laminates were clearly superior to those of Comparative Examples 1 to 3, which do not satisfy the requirement (1) of the invention. Further, in Comparative Examples 1 to 4, which do not include the constitution of the invention, the laminates were peeled off at the adhesion surface, were poor in the peeling strength, and thereby inferior to those of Examples.

The vulcanized rubber laminate of the present invention has the above-mentioned constitution, so that the vulcanized rubber layers are firmly bonded with remarkably excellent adhesiveness. Thus, the laminate is remarkably useful for such applications that one surface needs to have resistance to sour gasoline, gasoline permeation, alcohol-containing gasoline, etc. and the other surface needs to have thermal aging resistance, resistance to weather, gasoline, etc., such as fuel hoses and filler hoses.

What is claimed is:
1. A vulcanized rubber laminate obtained by thermal adhesion a layer of (A) an unvulcanized epichlorohydrin rubber composition to a layer of (B) an unvulcanized fluororubber composition, wherein
(A) the unvulcanized epichlorohydrin rubber composition comprises
(1) 100 parts by weight of an unvulcanized epichlorohydrin rubber containing an allyl glycidyl ether unit, or an unvulcanized epichlorohydrin rubber blend including at least an unvulcanized epichlorohydrin rubber containing an allyl glycidyl ether unit, the mole ratio of the unit to the total of the rubbers being 3 to 15 mol %,
(2) 0.3 to 5 parts by weight of a vulcanizing agent selected from the group consisting of quinoxaline-based vulcanizing agents, thiourea-based vulcanizing agents, bisphenol-based vulcanizing agents or a mixture thereof, and

(3) 0.1 to 5 parts by weight of a compound selected from the group consisting of 1,8-diazabicyclo(5,4,0)undecene-7 salts, 1,5-diazabicyclo(4,3,0)nonene-5 salts, quaternary ammonium salts, basic white carbons, and alkaline metal salts of higher fatty acids or a mixture thereof, with the proviso that the content of the basic white carbons is 0.1 to 30 parts by weight, and (B) the unvulcanized fluororubber composition comprises 100 parts by weight of an unvulcanized fluororubber and 0.1 to 10 parts by weight of an organic peroxide-based vulcanizing agent.

2. The vulcanized rubber laminate as claimed in claim 1, wherein the epichlorohydrin rubber is selected from the group consisting of an epichlorohydrin/ethylene oxide/allyl glycidyl ether terpolymer, an epichlorohydrin/allyl glycidyl ether copolymer, and a mixture thereof.

3. The vulcanized rubber laminate as claimed in claim 1, wherein the molecular weight of the unvulcanized epichlorohydrin rubber is 30 to 150 of Mooney viscosity $ML_{1+4}$ ($100°$ C.).

4. The vulcanized rubber laminate as claimed in claim 1, wherein the quinoxaline-based vulcanizing agent is selected from the group consisting of 2,3-dimercaptoquinoxaline, quinoxaline-2,3-dithiocarbonate, 6-methylquinoxaline-2,3-dithiocarbonate, 5,8-dimethylquinoxaline-2,3-dithiocarbonate and a mixture thereof, bisphenol-based vulcanizing agent is selected from the group consisting of bisphenol AF, bisphenol S and a mixture thereof, and the thiourea-based vulcanizing agent is selected from the group consisting of 2-mercaptoimidazoline, 1,3-diethylthiourea, 1,3-dibutylthiourea, trimethylthiourea and a mixture thereof.

5. The vulcanized rubber laminate as claimed in claim 1, wherein the 1,8-diazabicyclo(5,4,0)undecene-7 salts (hereinafter referred to also as DBU salts) is selected from the group consisting of DBU carbonate salts, DBU stearate salts, DBU 2-ethylhexanate salts, DBU benzoate salts, DBU-salicylate salts, DBU 3-hydroxy-2-naphthoate salts, DBU phenol resin salts, DBU 2-mercaptobenzothiazole salts, DBU 2-mercapto benzimidazole salts and a mixture thereof, the 1,5-diazabicyclo(4,3,0)nonene-5 salt (DBN salt) is selected from the group consisting of DBN carbonate salts, DBN stearate salts, DBN 2-ethylhexanate salt, DBN benzoate salts, DBN salicylate salts, DBN 3-hydroxy-2-naphthoate salts, DBN phenol resin salts, DBN 2-mercaptobenzothiazole salts, DBN 2-mercaptobenzimidazole salts and a mixture thereof, the quaternary ammonium salt is selected from the group consisting of quaternary ammonium salts, tetrabutylammonium salts, tetraoctylammonium salts and a mixture thereof, and the alkaline metal salt of higher fatty acid is selected from the group consisting of alkaline metal salt of partially hydrogenated tallow fatty acids, stearic acid, oleic acid, sebacic acid, castor oil and a mixture thereof.

6. The vulcanized rubber laminate as claimed in claim 1, wherein the fluororubber in the unvulcanized fluororubber composition is a copolymer of vinylidene fluoride and another copolymerizable fluorine-containing olefin, the copolymerizable fluorine-containing olefin being selected from the group consisting of hexafluoropropene, pentafluoropropene, trifluoroethylene, trifluorochloroethylene, tetrafluoroethylene, vinyl fluoride, perfluoro(methyl vinyl ether), and a mixture thereof.

7. The vulcanized rubber laminate as claimed in claim 1, wherein the organic peroxide-based vulcanizing agent is selected from the group consisting of tert-butyl hydroperoxide, p-menthane hydroperoxide, dicumyl peroxide, tert-butyl peroxide, 1,3-bis(tert-butylperoxyisopropyl)benzene, 2,5-dimethyl-2,5-di(tert-butylperoxy)hexane, benzoyl peroxide, and tert-butyl peroxybenzoate.

8. The vulcanized rubber laminate as claimed in claim 1, wherein the epichlorohydrin rubber is a terpolymer comprising 20 to 70 mol % of an epichlorohydrin unit, 20 to 79 mol % of an ethylene oxide unit, and 3 to 15 mol % of an allyl glycidyl ether unit.

9. The vulcanized rubber laminate as claimed in claim 1, wherein the epichlorohydrin rubber is a copolymer comprising 20 to 70 mol % of an epichlorohydrin unit and 30 to 80 mol % of ethylene oxide unit.

10. The vulcanized rubber laminate as claimed in claim 1, comprising 0.1 to 5 parts by weight of a vulcanization accelerator or vulcanization retardant, based on 100 parts by weight of the unvulcanized epichlorohydrin rubber.

11. The vulcanized rubber laminate as claimed in claim 1, wherein the unvulcanized epichlorohydrin rubber composition comprises
a metal compound and/or an inorganic microporous crystal, which act as an acid acceptor.

12. The vulcanized rubber laminate as claimed in claim 1, wherein said unvulcanized epichlorohydrin rubber composition (A) consists of components (1), (2) and (3).

13. The vulcanized rubber laminate as claimed in claim 1, wherein said unvulcanized fluororubber composition (B) consists of 100 parts by weight of said unvulcanized fluororubber and 0.1 to 10 parts by weight of said organic peroxide-based vulcanizing agent.

14. The vulcanized rubber laminate as claimed in claim 1, wherein the unvulcanized epichlorohydrin rubber composition (A) consists of components (1), (2), (3) and at least one additive selected from the group consisting of an antiaging agent, a filler, a reinforcing agent, a plasticizer, a processing aid, pigment, a flame retardant and a lubricant.

15. A vulcanized rubber laminate obtained by thermal adhesion a layer of (A) an unvulcanized epichlorohydrin rubber composition to a layer of (B) an unvulcanized fluororubber composition, wherein (A) the unvulcanized epichlorohydrin rubber composition consists of:
(1) 100 parts by weight of an unvulcanized epichlorohydrin rubber containing an allyl glycidyl ether unit, or an unvulcanized epichlorohydrin rubber blend including at least an unvulcanized epichlorohydrin rubber containing an allyl glycidyl ether unit, the mole ratio of the unit to the total of the rubbers being 3 to 15 mol %,
(2) 0.3 to 5 parts by weight of a vulcanizing agent selected from the group consisting of quinoxaline-based vulcanizing agents, thiourea-based vulcanizing agents, bisphenol-based vulcanizing agents or a mixture thereof, and
(3) 0.1 to 5 parts by weight of a compound selected from the group consisting of 1,8-diazabicyclo(5,4,0)undecene-7 salts, 1,5-diazabicyclo(4,3,0) nonene-5 salts, quaternary ammonium salts, basic white carbons, and alkaline metal salts of higher fatty acids or a mixture thereof, with the proviso that the content of the basic white carbons is 0.1 to 30 parts by weight,
(4) 0.5 to 50 parts by weight of an acid acceptor,
(5) 0 to 10 parts by weight of a vulcanization accelerator,
(6) 0 to 10 parts by weight of a vulcanization retardant, and
(B) the unvulcanized fluororubber composition comprises 100 parts by weight of an unvulcanized fluororubber and 0.1 to 10 parts by weight of an organic peroxide-based vulcanizing agent.

* * * * *